United States Patent
Ma et al.

(10) Patent No.: US 10,643,580 B2
(45) Date of Patent: May 5, 2020

(54) METHOD AND DEVICE FOR SWITCHING PLAYING MODE OF A MOBILE TERMINAL, STORAGE MEDIUM AND PROGRAM

(71) Applicant: GUANGZHOU UCWEB COMPUTER TECHNOLOGY CO., LTD., Guangzhou (CN)

(72) Inventors: Miaokui Ma, Guangzhou (CN); Xiaojun Chang, Guangzhou (CN)

(73) Assignee: Guangzhou UCWEB Computer Technology Co., Ltd., Guangzhou (CN)

( * ) Notice: Subject to any disclaimer, the term of this patent is extended or adjusted under 35 U.S.C. 154(b) by 0 days.

(21) Appl. No.: 15/315,269

(22) PCT Filed: Dec. 11, 2014

(86) PCT No.: PCT/CN2014/093640
§ 371 (c)(1),
(2) Date: Nov. 30, 2016

(87) PCT Pub. No.: WO2015/180448
PCT Pub. Date: Dec. 3, 2015

(65) Prior Publication Data
US 2017/0249925 A1 Aug. 31, 2017

(30) Foreign Application Priority Data

May 30, 2014 (CN) .......................... 2014 1 0238712
May 30, 2014 (CN) .......................... 2014 1 0238962

(51) Int. Cl.
*G06F 3/0481* (2013.01)
*G09G 5/38* (2006.01)
(Continued)

(52) U.S. Cl.
CPC ............... *G09G 5/38* (2013.01); *G06F 3/048* (2013.01); *G06F 3/14* (2013.01); *G06F 40/106* (2020.01);
(Continued)

(58) Field of Classification Search
CPC ....... G06F 3/0481; G06F 17/212; G06T 3/60; G09G 5/38
See application file for complete search history.

(56) References Cited

U.S. PATENT DOCUMENTS 5,430,870 A * 7/1995 Stanton ................... G06F 9/461
5,438,661 A * 8/1995 Ogawa .................. G06F 3/0481
715/259
(Continued)

FOREIGN PATENT DOCUMENTS

| CN | 102905181 A | 1/2013 |
| CN | 103281457 A | 9/2013 |
| CN | 103458106 A | 12/2013 |

OTHER PUBLICATIONS

International Search Report and Written Opinion from International Application No. PCT/CN2014/093640 dated Mar. 6, 2015.

*Primary Examiner* — Phenuel S Salomon
(74) *Attorney, Agent, or Firm* — Alston & Bird LLP

(57) ABSTRACT

Disclosed is a method and device for switching a playing mode of a mobile terminal, a storage medium and a program, including creating a full screen blank view and creating a full screen playing view, so that the full screen playing view covers the full screen blank view; loading a video content to be played into the full screen playing view; and after a rotation angle of a mobile terminal is received, rotating the video content which is loaded into the full screen playing view, and playing the rotated video content in the full screen playing view. By switching a playing mode of a mobile terminal, a non-full screen mode in a vertical screen form is (Continued)

switched to a full screen mode in a horizontal screen form; and a video content does not need to be recomposed any longer, thereby reducing hardware resources consumption and accelerating the switching process.

17 Claims, 14 Drawing Sheets

(51) Int. Cl.
- *G06F 3/048* (2013.01)
- *G06F 3/14* (2006.01)
- *G06F 40/106* (2020.01)
- *G06T 3/60* (2006.01)
- *G09G 5/14* (2006.01)

(52) U.S. Cl.
CPC ........ *G06T 3/60* (2013.01); *G06F 2200/1614* (2013.01); *G09G 5/14* (2013.01); *G09G 2320/08* (2013.01); *G09G 2340/0471* (2013.01); *G09G 2340/0478* (2013.01); *G09G 2340/0492* (2013.01); *G09G 2354/00* (2013.01)

(56) References Cited

U.S. PATENT DOCUMENTS

| | | | | |
|---|---|---|---|---|
| 5,566,287 | A * | 10/1996 | Delpuch | G09G 5/14 345/619 |
| 6,487,565 | B1 * | 11/2002 | Schechter | G06T 15/00 345/418 |
| 8,229,287 | B1 * | 7/2012 | Duggal | H04N 5/76 386/343 |
| 8,736,664 | B1 * | 5/2014 | Gruenig | H04N 5/93 348/36 |
| 8,813,133 | B1 * | 8/2014 | DePrez | G06F 3/0481 725/61 |
| 9,317,175 | B1 * | 4/2016 | Lockhart | G06F 3/04815 |
| 9,501,460 | B1 * | 11/2016 | Battre | G06F 17/24 |
| 2003/0069900 | A1 * | 4/2003 | Hind | G06Q 10/107 |
| 2003/0110234 | A1 * | 6/2003 | Egli | G06T 3/4092 709/217 |
| 2004/0107403 | A1 * | 6/2004 | Tetzchner | G06F 17/30905 715/227 |
| 2004/0268400 | A1 * | 12/2004 | Barde | H04N 7/17318 725/94 |
| 2005/0071752 | A1 * | 3/2005 | Marlatt | G06F 17/248 715/222 |
| 2005/0212799 | A1 * | 9/2005 | Liao | G06T 11/60 345/420 |
| 2005/0219220 | A1 * | 10/2005 | Kishi | G06F 1/1616 345/169 |
| 2006/0274070 | A1 * | 12/2006 | Herman | A63F 13/10 345/474 |
| 2007/0093281 | A1 * | 4/2007 | Park | H04M 1/0233 455/575.4 |
| 2007/0097138 | A1 * | 5/2007 | Sorotokin | G06F 17/2247 345/581 |
| 2007/0132783 | A1 * | 6/2007 | Lim | G06T 11/60 345/629 |
| 2008/0154889 | A1 * | 6/2008 | Pfeiffer | G06F 17/3084 |
| 2009/0058882 | A1 * | 3/2009 | Adachi | G06F 1/1622 345/650 |
| 2009/0082061 | A1 * | 3/2009 | Roh | H04M 1/72563 455/556.1 |
| 2009/0124295 | A1 * | 5/2009 | Watanabe | H04N 5/4401 455/566 |
| 2009/0327100 | A1 * | 12/2009 | Greenberg | G06F 3/0481 705/26.1 |
| 2010/0085583 | A1 * | 4/2010 | Cairns | G06K 15/02 358/1.2 |
| 2010/0151913 | A1 * | 6/2010 | Park | G06F 1/1626 455/566 |
| 2010/0214320 | A1 * | 8/2010 | Mo | G06F 1/1626 345/653 |
| 2011/0221667 | A1 * | 9/2011 | Lee | G01B 7/30 345/156 |
| 2013/0219276 | A1 | 8/2013 | Shan et al. | |
| 2013/0312026 | A1 * | 11/2013 | Lee | H04N 21/234 725/32 |
| 2014/0089802 | A1 * | 3/2014 | Wang | H04N 21/482 715/719 |
| 2014/0111548 | A1 * | 4/2014 | Shin | G09G 5/32 345/650 |
| 2014/0245163 | A1 * | 8/2014 | Mubarek | G06F 3/0484 715/738 |
| 2014/0325323 | A1 * | 10/2014 | Liu | G06F 9/445 715/201 |
| 2015/0231505 | A1 * | 8/2015 | Imai | A63F 13/10 463/29 |
| 2015/0325271 | A1 * | 11/2015 | Kim | G11B 27/11 386/230 |

* cited by examiner

METHOD AND DEVICE FOR SWITCHING PLAYING MODE OF A MOBILE TERMINAL, STORAGE MEDIUM AND PROGRAM

CROSS-REFERENCE TO RELATED APPLICATION

This application claims priority to and the benefit of PCT/CN2014/093640, filed Dec. 11, 2014, which claims priority and the benefit of Chinese Patent Application Serial No. 201410238712.7, filed with the State Intellectual Property Office of P.R. China on May 30, 2014, and Chinese Patent Application Serial No. 201410238962.0, filed with the State Intellectual Property Office of P.R. China on May 30, 2014, the entire contents each of which is incorporated herein by reference in its entirety.

TECHNICAL FIELD

The present invention relates to the technical field of information processing, and more particularly to a method for switching playing mode of a mobile terminal and the device thereof.

BACKGROUND ART

Today, the performance of a mobile terminal is increasingly improved. Users can access a browser via a mobile terminal, and then use the browser to play online video directly.

When using a mobile terminal to play an online video, the default playing mode is typically a non-full-screen mode. In such non-full-screen mode, the online video is usually played in a vertical (portrait) style. Accordingly, in order to improve the visual experience, users are more likely to watch the online video in a full screen mode. In the full screen mode, an online video is usually played in a horizontal (landscape) style. As a result, in order to watch an online video in a full screen mode in a horizontal (landscape) style, the mobile terminal needs to switch from the non-full-screen mode to the full screen mode, as well as switch from vertical style to the horizontal style, such that switch from the non-full-screen mode in vertical style to the full screen mode in horizontal style. In the existing technology available in the art, when switching the playing mode of a mobile terminal, the view of a video needs to be separated from the WebView and then placed to a full screen view, and the whole WebView needs to be rotated to a horizontal displaying style according to the orientation of activity. In this way, the video is now played in a horizontal full screen mode, which takes full advantages of the entire screen area. However, in such method, due to the rotation of WebView, the browser kernel needs to reformat. In addition, after the full screen playing is finished, the WebView will returns back to the non-full-screen mode. Accordingly, the WebView makes another switch from the horizontal style to the vertical style; and as a result, the browser kernel needs to reformat again. It is noted that the browser kernel reformatting needs to recalculate the coordinate and size of each webpage element. Therefore, in the case of switching between horizontal and vertical style, the browser kernel needs to conduct a reformatting process that will take up a lot of CPU and other hardware resources, and thus further leading to a slower switching speed, Moreover, during the course of reformatting, users will see a messy webpage, which leads to a poor user experience.

SUMMARY OF THE INVENTION

The embodiments of the present application disclose a method for switching playing mode of a mobile terminal. This method comprises, firstly, creating a full screen blank view, and creating a full screen playing view, so that the full screen playing view covers the full screen blank view; and then loading a video content to be played to the full screen playing view; according to a received rotation angle of a mobile terminal, rotating the video content which has been loaded to the full screen playing view, and then playing the rotated video content in the full screen playing view.

In another aspect of the embodiments of the present invention, a device for switching playing mode of a mobile terminal has also been disclosed, which comprises one or a plurality of processors, and one or a plurality of memories that stores computer executable instructions; when the executable instructions are executed, the one or a plurality of processors perform the following steps: creating a full screen blank view, and creating a full screen playing view, so that the full screen playing view covers the full screen blank view; and then loading a video content to be played to the full screen playing view; [05] according to a received rotation angle of a mobile terminal, rotating the video content which has been loaded to the full screen playing view, and then playing the rotated video content in the full screen playing view.

In yet another aspect of the embodiments of the present invention, a computer readable medium that contains processor executable program code is provided, which can be applied in a mobile terminal. The program code enables a processor to perform the following steps: creating a full screen blank view, and creating a full screen playing view, so that the full screen playing view covers the full screen blank view; and then loading a video content to be played to the full screen playing view; according to a received rotation angle of a mobile terminal, rotating the video content which has been loaded to the full screen playing view, and then playing the rotated video content in the full screen playing view.

Lastly, the embodiments of the present invention further provide a program for switching playing mode of a mobile terminal, which comprises the steps of the foregoing method.

By virtue of rotating video content, the method for switching playing mode of a mobile terminal provided in the present invention is able to achieve switching playing mode of a mobile terminal in which a vertical style non-full-screen mode is switched to a horizontal style full screen mode. In addition, during the switching process, due to the fact that what has been changed is the rendering direction of the video content in the full screen playing view, the browser does not need to reformat the webpage anymore, which helps to reduce the consumption on CPU and other hardware resources resulting from the browser kernel reformatting the current video page, and thereby accelerating the switching process and more smoothly playing the video.

Furthermore, in the existing technology currently available in the art, video screen switching may lead to corrupted content displayed on the screen when the WebView displays the content of the current video page, which would significantly affect user experience. While the present application does not need reformatting, and accordingly, no corrupted content will be displayed on the screen, which helps to improve user experience.

BRIEF DESCRIPTION OF THE DRAWINGS

In order to more clearly describe the technical solutions provided in the embodiments of the present invention or in the existing technologies in the art, the drawings used in the descriptions for in the embodiments of the present invention or the existing technologies in the art will be briefly described next. Obviously, the drawings in the following description are only a few exemplary embodiments of the present invention. A person of ordinary skill in the art is able to know that other drawings could be easily obtained based on the drawings provided below with no need of any creative work.

DESCRIPTION OF THE EMBODIMENTS

The following embodiments of the present invention provide a method and device for switching playing mode of a mobile terminal, which help to solve the technical problem that when switching the playing mode of a mobile terminal, the video content needs to be reformatted, which would consume a great deal of time and resources, and, accordingly, compromise the view content displaying.

In order to enable those skilled in the art to better understand the technical solutions provided in the embodiments of the present invention, as well as to make the objects, features and advantages of the embodiments of the present invention more easily understood, the technical solutions provided in the embodiments of the present invention will be further described in details in reference to the accompanying drawings.

Figure 1:
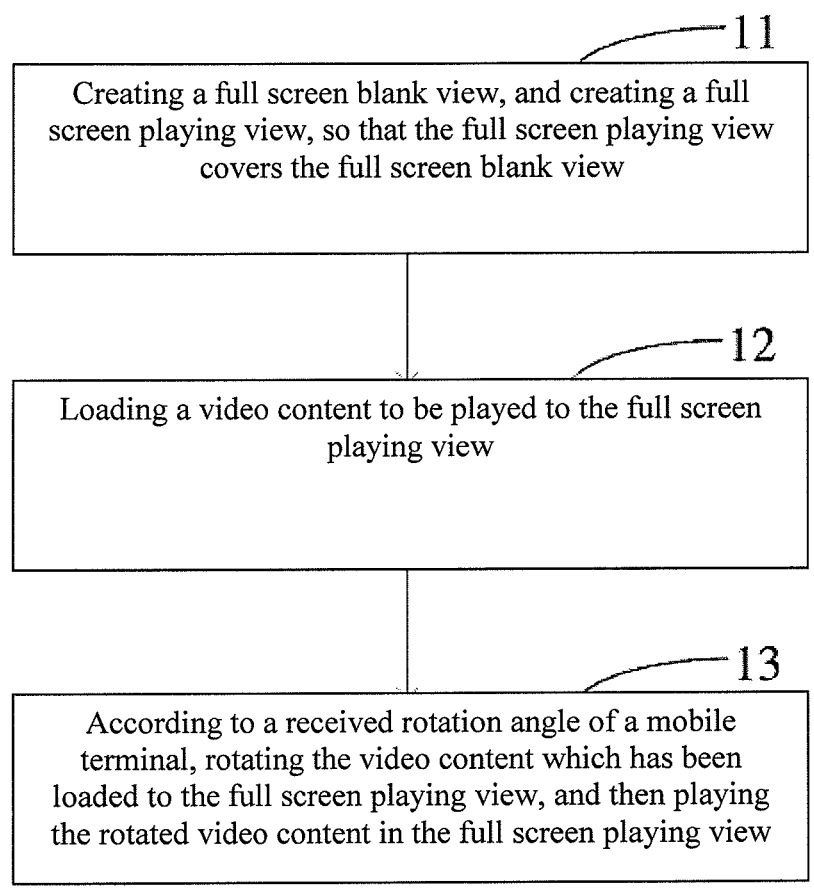
FIG. 1 is a flow chart of one exemplary embodiment of the method for switching playing mode of a mobile terminal provided in the present invention.

In reference to the schematic view of the flow chart of the method shown in FIG. 1, the method for switching playing mode of a mobile terminal provided in one embodiment of the present invention comprises the steps as follows:

Step 11, creating a full screen blank view, and creating a full screen playing view, so that the full screen playing view covers the full screen blank view.

In the case when a user needs to play an online video, the default playing model of a mobile terminal is typically a non-full-screen mode. In such a case, if the user selects to play the online video in a full screen mode, the mobile terminal needs to switch its playing mode. In the method for switching playing mode of a mobile terminal provided in the present invention, following creating a full screen blank view, a full screen playing view needs to be further created, and the full screen playing view needs to cover the full screen blank view.

Step 12, acquiring a video content to be played, and then loading the video content to be played to the full screen playing view.

Step 13, according to a received rotation angle of a mobile terminal, rotating the video content which has been loaded to the full screen playing view, for example, changing the orientation of the video content by way of changing the rendering direction of the video content in the full screen playing view, and then playing the rotated video content in the full screen playing view. Preferably, according to a received rotation angle of a mobile terminal, rotate the video content which has been loaded to the full screen playing view.

As for the specific value of the rotation angle of a mobile terminal, it could be determined according to the user's viewing requirement. Due to the fact that in a non-full-screen mode, the video content is usually played in a vertical style, while in a full screen mode, the video content is usually played in a horizontal style, in order to achieve the switching from the video content in the vertical style to that in the horizontal style, the rotation angle of a mobile terminal is usually 90±360 degrees or 270±360 degrees. Of course, based on the user's viewing requirement, the rotation angle of a mobile terminal can be any other values. There is no any limitation to this value in the present invention.

Figure 2A:
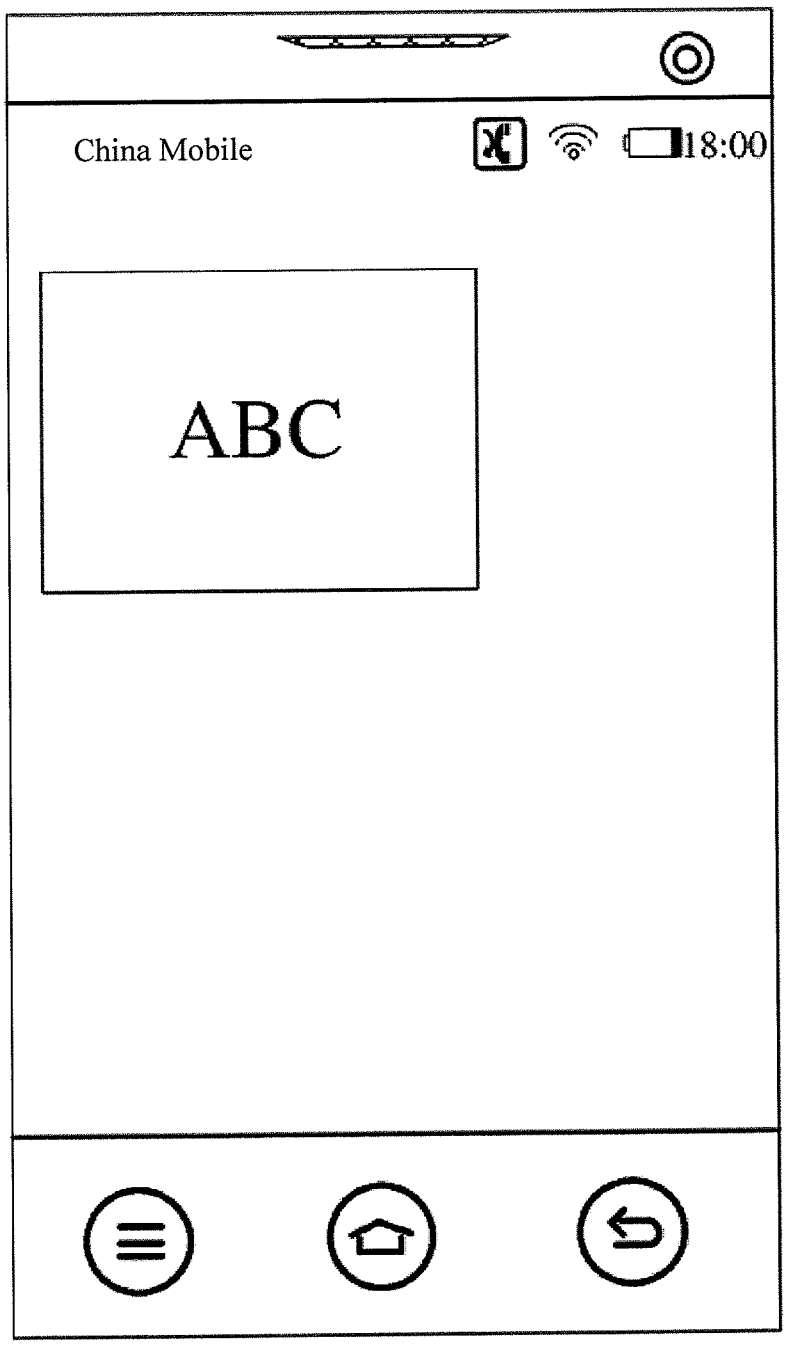
FIG. 2(a) is a schematic view of the screen in the non-full-screen mode of a mobile terminal.
Figure 2B:
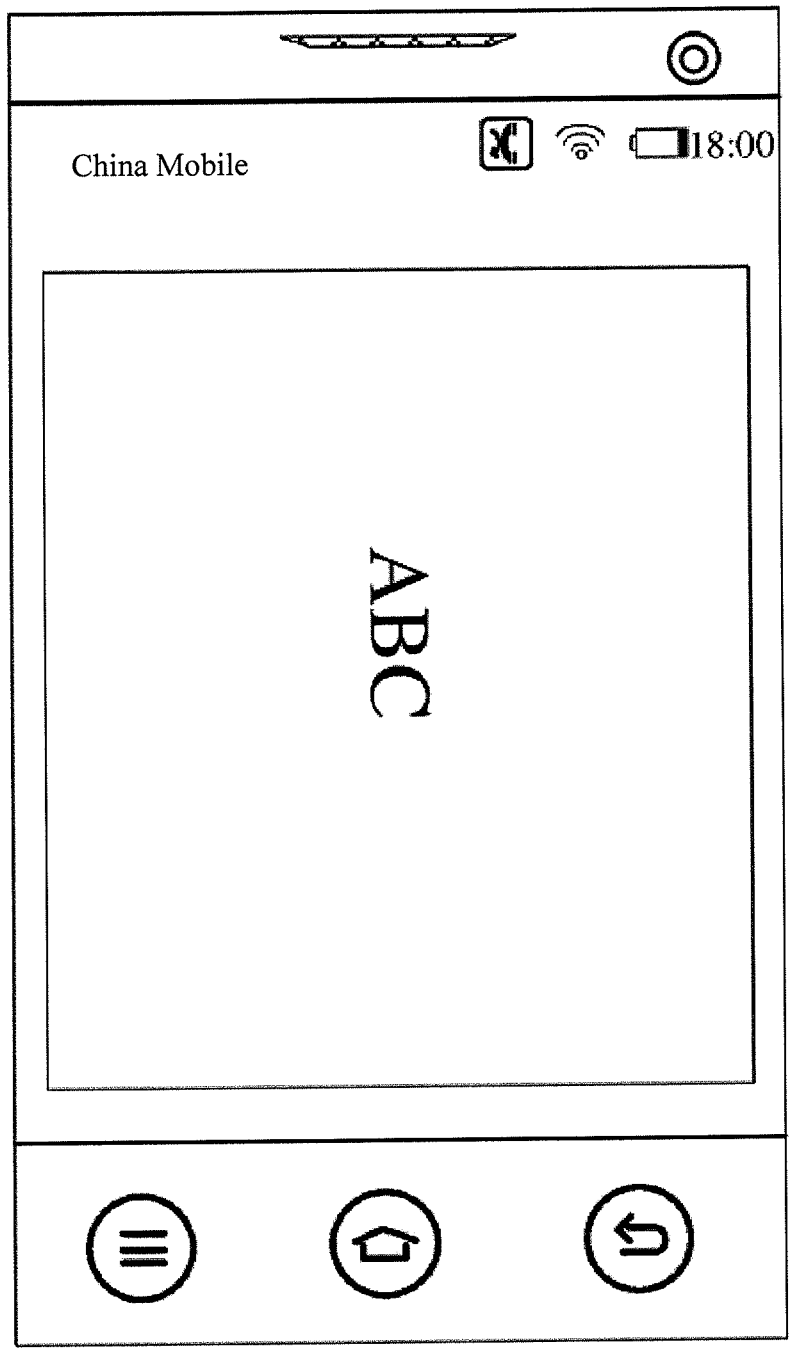
FIG. 2(b) is a schematic view of the screen in the full screen mode of a mobile terminal according to the method for switching playing mode of a mobile terminal disclosed in the present invention.
Figure 2C:
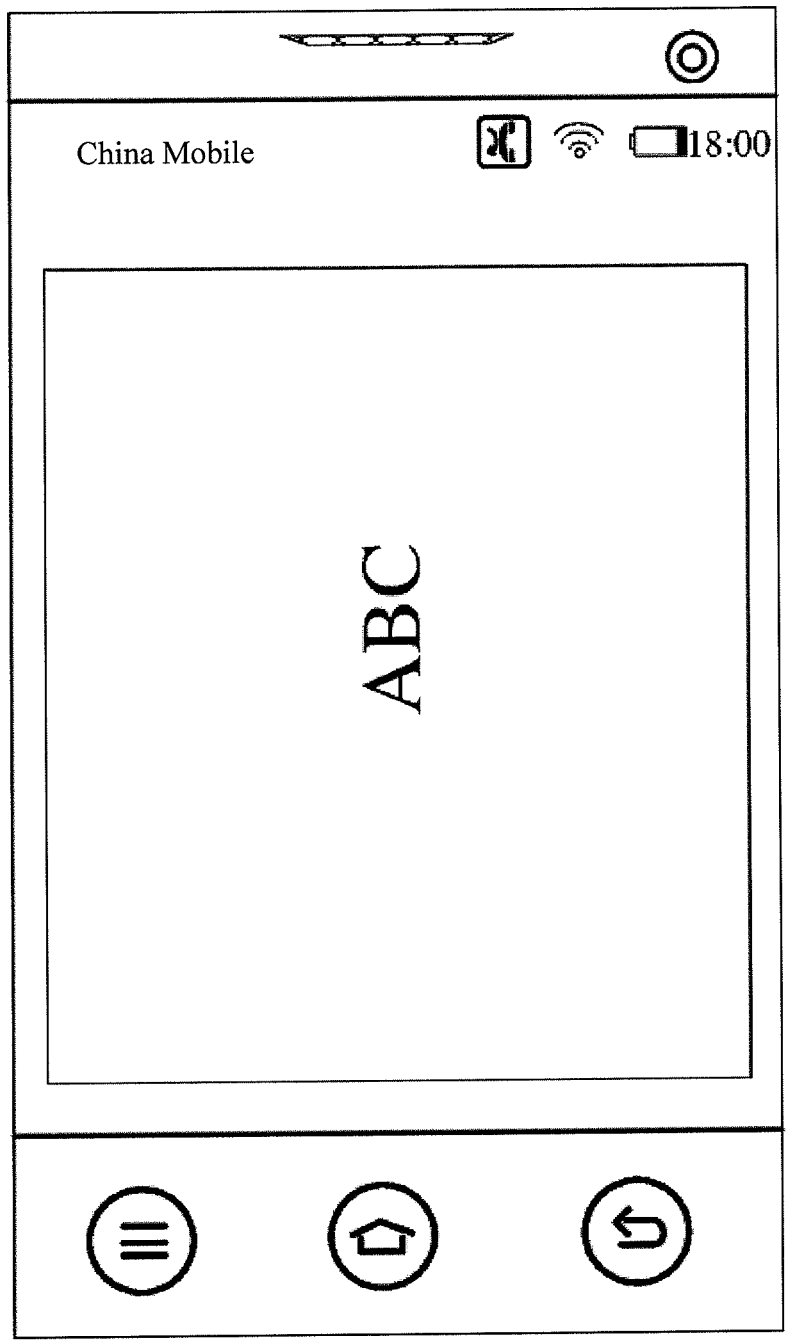
FIG. 2(c) is another schematic view of the screen in the full screen mode of a mobile terminal according to the method for switching playing mode of a mobile terminal disclosed in the present invention.

In reference to the schematic views of the screen of a mobile terminal shown in FIGS. 2(a) to 2(c), the playing mode shown in FIG. 2(a) is a non-full-screen mode; in such a case, the video content is displayed in a vertical style. In addition, the playing mode shown in FIG. 2(b) is a full screen mode; in such a case, the video content has a rotation based on the rotation angle of a mobile terminal, and the rotation angle of a mobile terminal is usually 90±360 degrees. As a result, the video content is displayed in the full screen playing view in a horizontal style. Moreover, the playing mode shown in FIG. 2(c) is a full screen mode as well. In such a case, in certain embodiments of the present invention, the video contents have a rotation based on the rotation angle of a mobile terminal, and the rotation angle of a mobile terminal is usually 270±360 degrees. As a result, the video content is displayed in the full screen playing view in a horizontal style.

Some embodiments of the present invention provide a method for switching playing mode of a mobile terminal. This method comprises the following steps: firstly, creating a full screen blank view, and creating a full screen playing view, so that the full screen playing view covers the full screen blank view; and then loading a video content to be played to the full screen playing view; according to a received rotation angle of a mobile terminal, rotating the video content which has been loaded to the full screen playing view, and then playing the rotated video content in the full screen playing view.

By virtue of rotating video content, the method for switching playing mode of a mobile terminal provided in the present invention is able to achieve switching playing mode of a mobile terminal, in which a vertical style non-full-screen mode is switched to a horizontal style full screen mode. In addition, during the switching process, due to the fact that what has been changed is the rendering direction of the video content in the full screen playing view, the browser does not need to reformat the webpage anymore, which helps to reduce the consumption on CPU and other hardware resources resulting from the browser kernel reformatting the current video page, and thereby accelerating the switching process and more smoothly playing the video.

Moreover, in the existing technology currently available in the art, video screen switching may lead to a corrupted content displayed on the screen when the WebView displays the content of the current video page, which would significantly affect user experience. While the present application does not need reformatting, and accordingly, no corrupted content will be displayed on the screen, which helps to improve user experience.

Figure 3:
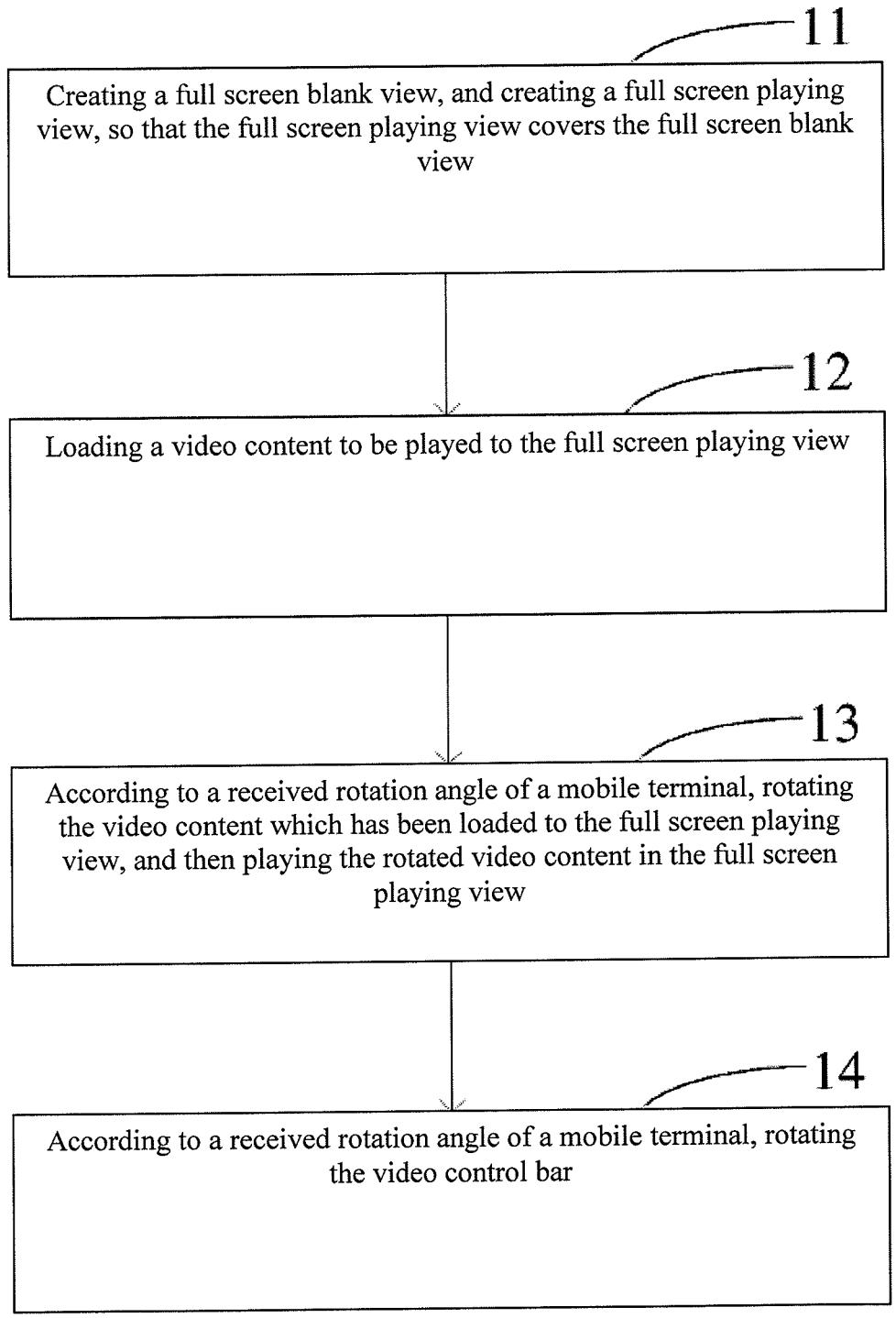
FIG. 3 is a flow chart of another exemplary embodiment of the method for switching playing mode of a mobile terminal provided in the present invention.

In reference to FIG. 3, the method for switching playing mode of a mobile terminal provided in the present invention further comprises:

Step 14, according to the rotation angle of a mobile terminal, rotating the video control bar.

In the description provided above and the work flow shown in FIG. 3, after finishing the operation of step 13, that is to say, after completion of rotating the video content, the video control bar will be rotated as well. In practice, the step of rotating the video control bar may also be carried out prior to rotating the video content, or at the same time with rotating the video content. That is to say, there is no limitation to this step in this application.

The rotation angle of the video control bar is the same as the rotation angle of the video content. In this way, it can facility the user to learn the playing progress of the video content while the user is viewing the video content in a full screen mode.

On the other hand, in order to avoid switching errors, a determination operation could be performed between steps 12 and step 13. This operation determines whether the video content loaded to the full screen playing view is in a vertical style, if it is yes, then according to the rotation angle of a mobile terminal, rotate the video content which has been loaded to the full screen playing view, so as to achieve a switch from the vertical style to the horizontal style; while if it is no, then it indicates that the current video content is already in a horizontal style, which can be played directly without a rotation.

Figure 4:
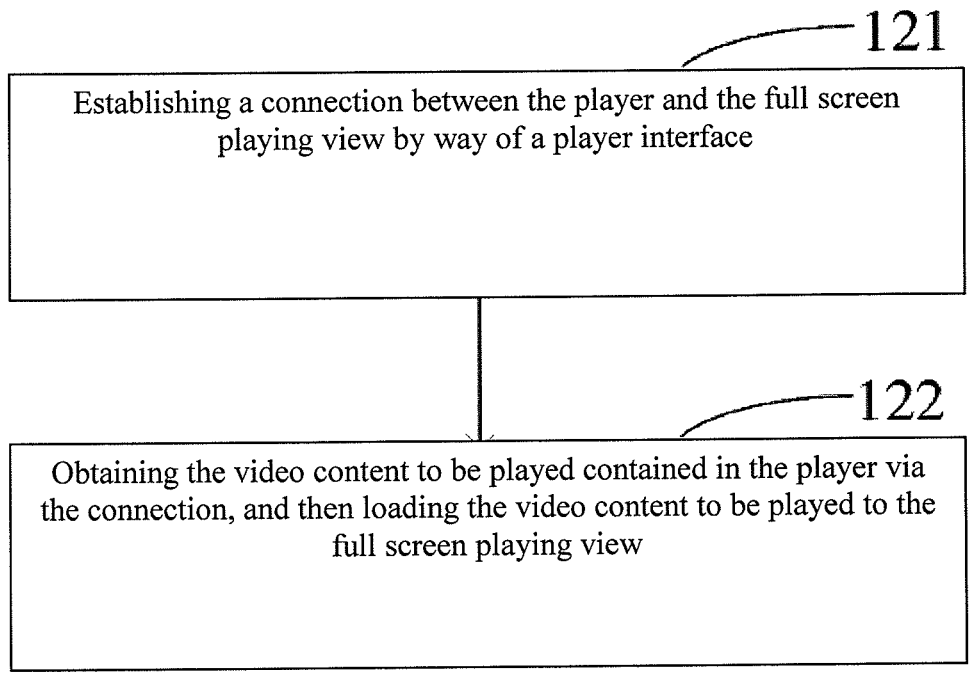
FIG. 4 is a schematic view of a mechanism of loading video content for the method for switching playing mode of a mobile terminal provided in the present invention.

In the step 12, it has disclosed a step of loading the video content to be played to the full screen playing view. This step may be implemented by way of a variety of different approaches. In reference to FIG. 4, in one of the implementation approach, the step of loading the video content to be played to the full screen playing view comprises:

Step 121, establish a connection between the player and the full screen playing view by way of a player interface.

Step 122, obtain the video content to be played contained in the player via the connection, and then load the video content to be played to the full screen playing view.

In the technical solution disclosed in the step 121 and step 122, a connection between the player and the full screen playing view is first set up via a player interface; subsequently the video content contained in the player is obtained and then loaded to the full screen playing view.

Figure 5:
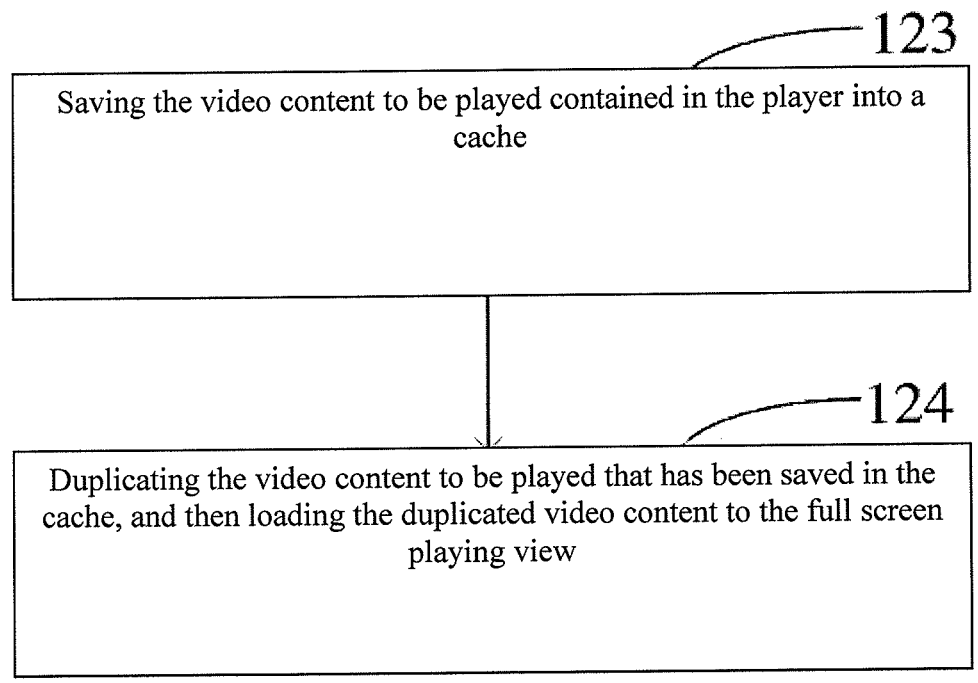
FIG. 5 is a schematic view of another mechanism of loading video content for the method for switching playing mode of a mobile terminal provided in the present invention.

Optionally, in reference to FIG. 5, in another approach of implementation, the step of loading the video content to be played to the full screen playing view comprises:

Step 123, save the video content to be played contained in the player into a cache.

Step 124, duplicate the video content to be played that has been saved in the cache, and then load the duplicated video content to the full screen playing view.

By way of the technical solution disclosed in the step 123 and step 124, the video content to be played has been loaded to the full screen playing view.

Figure 6:
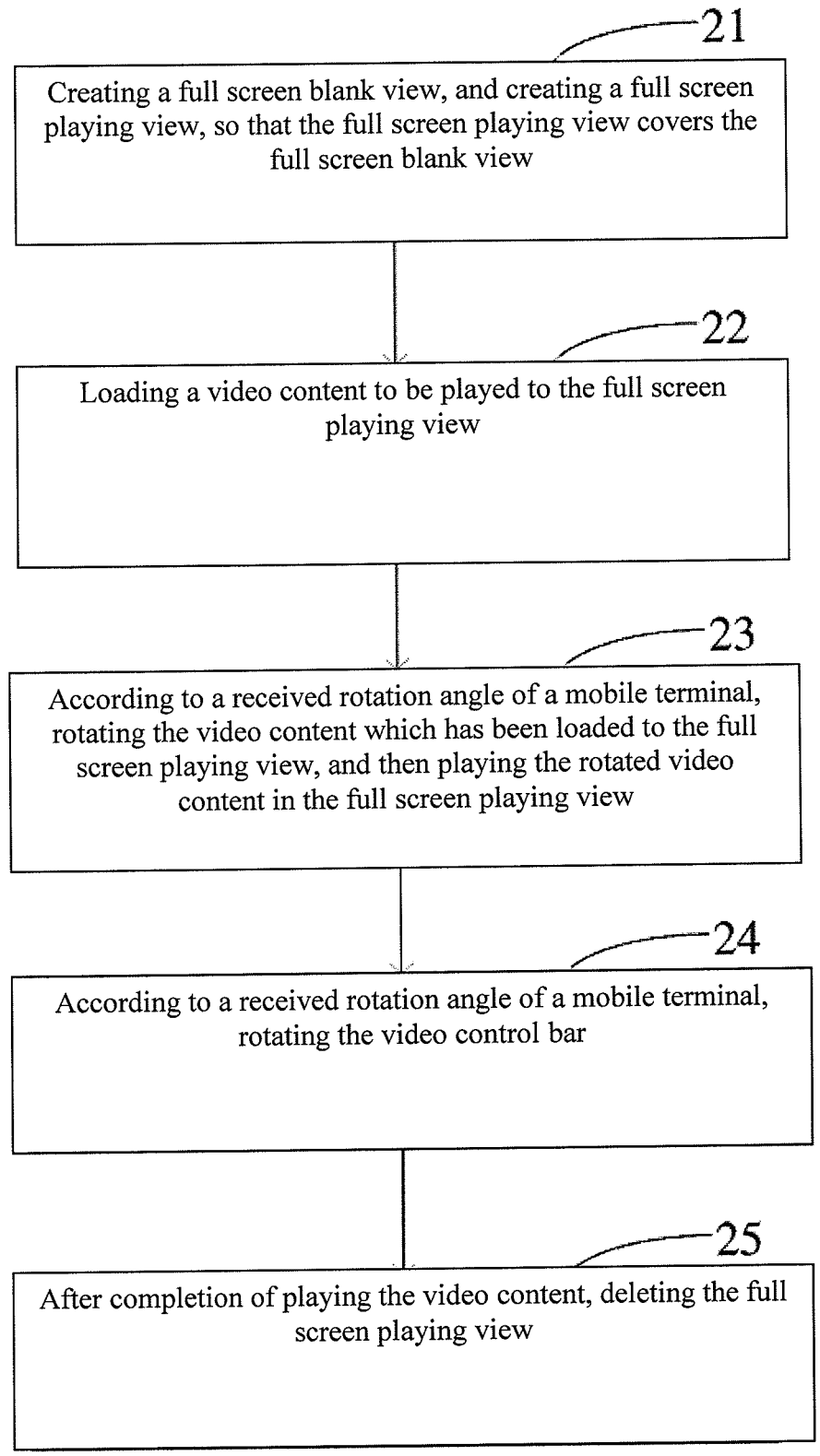
FIG. 6 is a flow chart of another exemplary embodiment of the method for switching playing mode of a mobile terminal provided in the present invention.

Furthermore, some embodiments of the present invention also provide a method for switching playing mode of a mobile terminal. In reference to FIG. 6, the method for switching playing mode of a mobile terminal comprises:

Step 21, creating a full screen blank view, and creating a full screen playing view, so that the full screen playing view covers the full screen blank view.

Step 22, loading a video content to be played to the full screen playing view.

Step 23, according to a received rotation angle of a mobile terminal, rotating the video content which has been loaded to the full screen playing view, for example, changing the orientation of the video content by way of changing the rendering direction of the video content in the full screen playing view, and then playing the rotated video content in the full screen playing view.

Step 24, according to the rotation angle of a mobile terminal, rotating the video control bar.

The implementation process of the steps from 21 to 24 is the same as the implementation process of the steps from 11 to 14. According, the previously described implementation process can be used as a reference, and the specific procedures will not be repeated again here.

Step 25, after completion of playing the video content, deleting the full screen playing view.

In this process, after completion of playing the video content, the full screen playing view is deleted, in order to avoid the issue in the existing technology in the art, in which when the playing mode is switched to a full screen mode, after completion of playing the video content, the browser needs to reformat the WebView of the webpage that contains the current video.

In the method for switching playing mode of a mobile terminal disclosed in the embodiment of the present invention, after completion of playing the video content, the full screen playing view is deleted. As a result, the present invention does not need a reformatting process, which helps to reduce the consumption on CPU and other hardware resources, and thereby accelerating the switching process and more smoothly playing the video and reducing the time for switching. The foregoing process can help the user to perform other operations to the mobile terminal. In addition, since the present application does not need reformatting, and accordingly, no corrupted content will be displayed on the screen, which helps to improve user experience.

For easily understanding the present invention, the method for switching playing mode of a mobile terminal disclosed in the embodiment of the present invention will be further described in details through two specific embodiments of the present invention.

Figure 7:
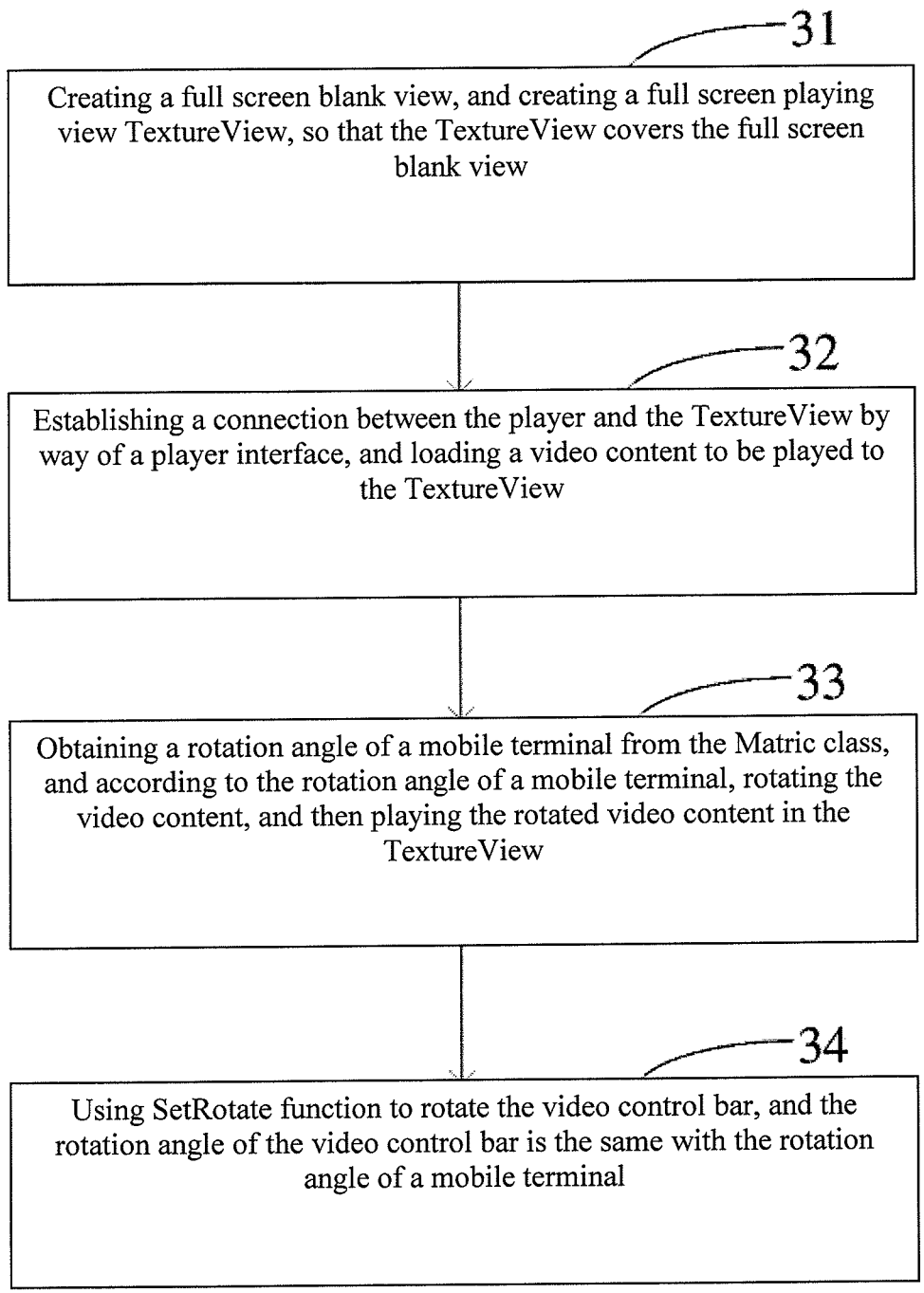
FIG. 7 is a flow chart of another exemplary embodiment of the method for switching playing mode of a mobile terminal provided in the present invention.

In the first embodiment of the present invention, in reference to FIG. 7, the method comprises the steps of:

Step 31, creating a full screen blank view, and creating a full screen playing view, wherein the full screen playing view is a TextureView, and the TextureView covers the full screen blank view.

Step 32, by way of calling the player interface, establishing a connection between the TextureView and the player, and then loading the video content to be played in the player to the TextureView.

Step 33, acquiring the rotation angle of a mobile terminal that has been set up in the Matrix class, and then according to the rotation angle of a mobile terminal, rotating the video content by way of changing the rendering direction of the video content in the TextureView, and next playing the rotated video content in the TextureView.

In the foregoing step, the rotation angle of a mobile terminal that has been set up in the Matrix class is typically 90±360 degrees or 270±360 degrees. Of course, the rotation angle of a mobile terminal can be any other values set by the user. There is no any limitation to this value in the present invention. In addition, the Matrix class in the present invention is used to provide the rotation angle of a mobile terminal needed in rotation of the video content. Moreover, the Matrix class may be created after loading the video content to the TextureView; alternatively, it may be created prior to the step 32. There is no any limitation to it in the present invention.

In addition, the method for switching playing mode of a mobile terminal disclosed in this embodiment of the present invention further comprises:

Step 34, using the setRotate function to rotate the video control bar, and the rotation angle of the video control bar is the same as the rotation angle of a mobile terminal.

In the description provided above and the work flow shown in FIG. 7, after completion of rotating the video content, the video control bar will be rotated. However, in practice, the step of rotating the video control bar may also be carried out prior to rotating the video content, or at the same time with rotating the video content. That is to say, there is no limitation to this step in this application.

Figure 8:
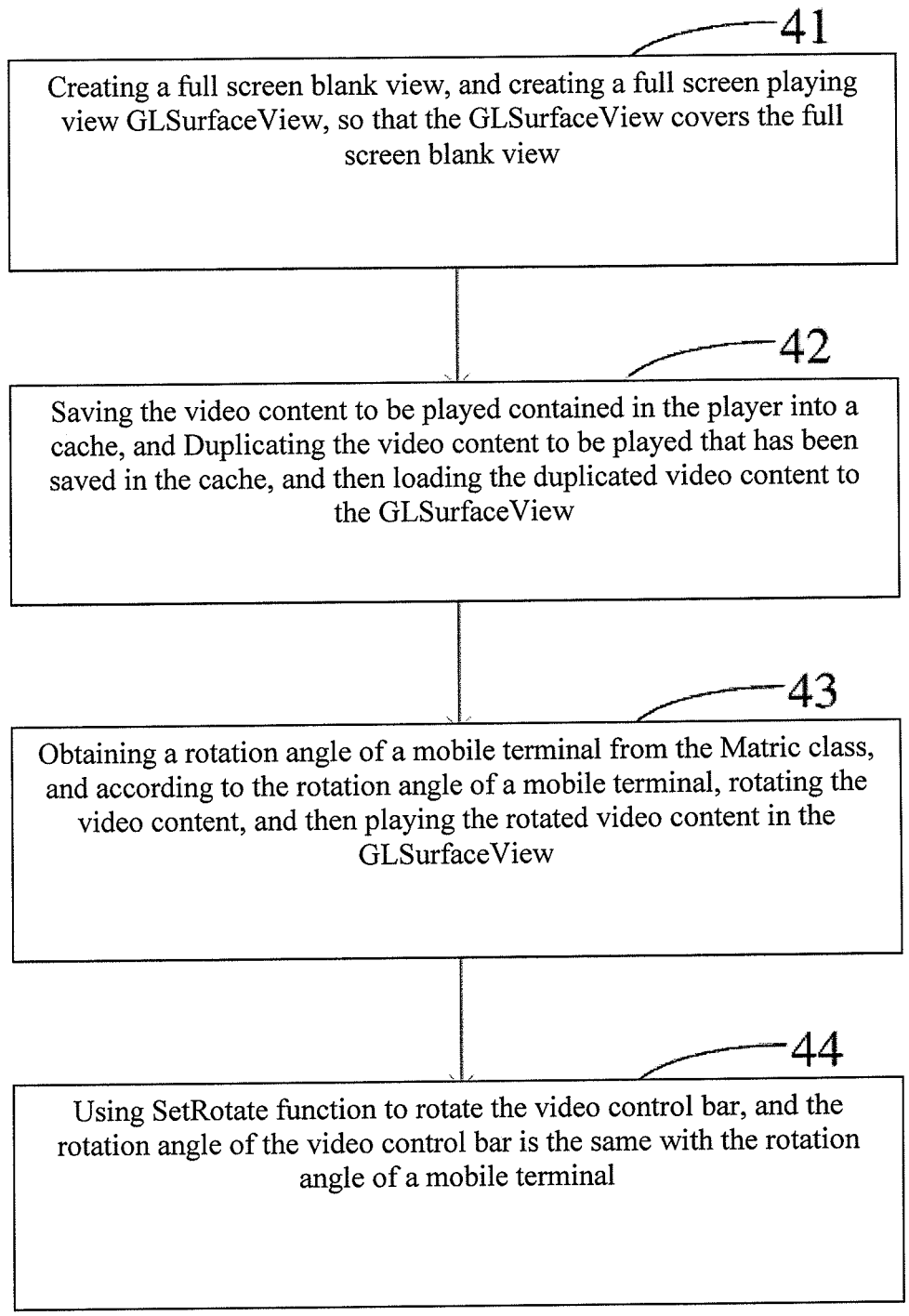
FIG. 8 is a flow chart of another exemplary embodiment of the method for switching playing mode of a mobile terminal provided in the present invention.

In the second embodiment of the present invention, in reference to FIG. 8, the method comprises the steps of:

Step 41, creating a full screen blank view, and creating a full screen playing view, wherein the full screen playing view is a GLSurfaceView (OpenGL Surface View), and the GLSurfaceView covers the full screen blank view.

Step 42, saving the video content to be played contained in the player into a cache, and then duplicating the video content to be played that has been saved in the cache, next loading the duplicated video content to the GLSurfaceView.

Step 43, acquiring the rotation angle of a mobile terminal that has been set up in the Matrix class, and then according to the rotation angle of a mobile terminal, rotating the video content, and next playing the rotated video content in the GLSurfaceView.

In the foregoing step, the rotation angle of a mobile terminal that has been set up in the Matrix class is typically 90±360 degrees or 270±360 degrees. Of course, the rotation angle of a mobile terminal can be any other values set by the user. There is no any limitation to this value in the present invention. In addition, the Matrix class in the present invention is used to provide the rotation angle of a mobile terminal needed in rotation of the video content. Moreover, the Matrix class may be created after loading the video content to the TextureView; alternatively, it may be created prior to the step 32. There is no any limitation to it in the present invention.

In addition, the method for switching playing mode of a mobile terminal disclosed in this embodiment of the present invention further comprises:

Step 44, using the setRotate function to rotate the video control bar, and the rotation angle of the video control bar is the same as the rotation angle of a mobile terminal.

In the description provided above and the work flow shown in FIG. 8, after completion of rotating the video content, the video control bar will be rotated. However, in practice, the step of rotating the video control bar may also be carried out prior to rotating the video content, or at the same time with rotating the video content. That is to say, there is no limitation to this step in this application.

In the foregoing two embodiments of the present invention, the method for switching playing mode of a mobile terminal of the present invention has been respectively described in the cases when the full screen playing view is TextureView or GLSurfaceView. Due to the fact that when the two embodiments switch playing mode they do not need to reformat their current webpage, they are able to reduce the consumption on the CPU and other hardware resources resulting from the reformatting process, and thereby accelerating the switching process and reducing the time for switching playing mode when playing a video in the browser. Furthermore, since the present application does not need reformatting, and accordingly, no corrupted content will be displayed on the screen, which helps to improve user experience.

Figure 9:
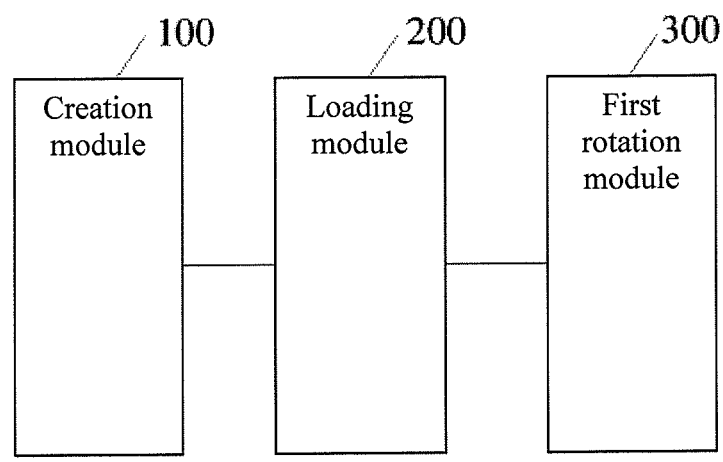
FIG. 9 is a block diagram of one exemplary embodiment of the device for switching playing mode of a mobile terminal provided in the present invention.

Correspondingly, the present invention also discloses a device for switching playing mode of a mobile terminal. In reference to FIG. 9, the device for switching playing mode of a mobile terminal comprises: a creation module 100, a loading module 200 and a first rotation module 300.

In the foregoing device, the creation module 100 is used for creating a full screen blank view, and creating a full screen playing view, so that the full screen playing view covers the full screen blank view.

The loading module 200 is used for loading a video content to be played to the full screen playing view.

The first rotation module 300 is used for rotating the video content which has been loaded to the full screen playing view according to a received rotation angle of a mobile terminal, and then playing the rotated video content in the full screen playing view.

Figure 10:
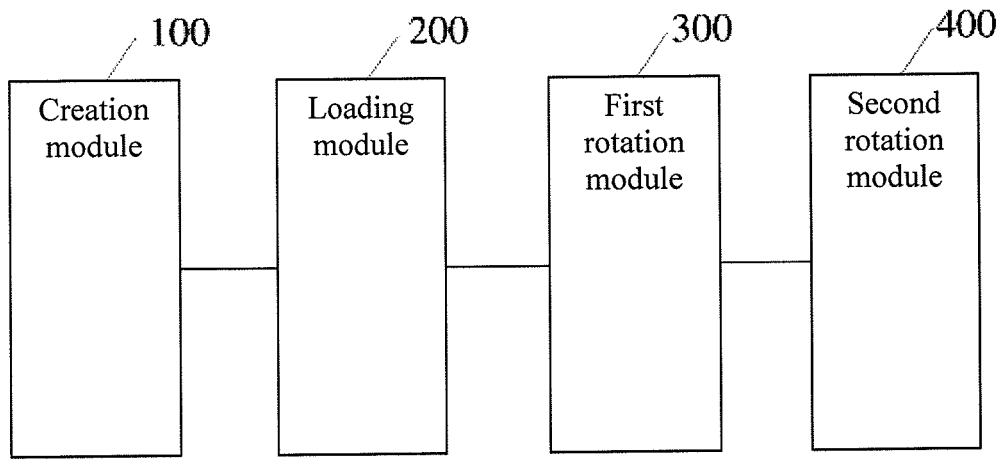
FIG. 10 is a block diagram of another exemplary embodiment of the device for switching playing mode of a mobile terminal provided in the present invention.

Moreover, in reference to FIG. 10, the device for switching playing mode of a mobile terminal further comprises a second rotation module 400, wherein the second rotation module 400 is used for, according to a received rotation angle of a mobile terminal, rotating the video control bar.

The loading module 200 may be in a plurality of different forms. In one of its implementation forms, the loading module 200 may comprise a connection unit and a first loading unit.

In the foregoing structure, the connection unit is used for establishing a connection between the player and the full screen playing view via the player interface.

The first loading unit is used for obtaining the video content to be played that is contained in the player through the foregoing connection, and then loading the video content to be played to the full screen playing view.

In another implementation form, the loading module 200 may comprise a storage unit and a second loading unit.

In the foregoing structure, the storage unit is used for saving the video content to be played that is contained in the player to the cache.

The second loading unit is used for duplicating the video content to be played that is saved in the cache, and then loading the duplicated video content to be played to the full screen playing view.

Moreover, the device for switching playing mode of a mobile terminal comprises: a deletion module, wherein the deletion module is used for deleting the full screen playing view after completion of playing the video content.

In addition, the rotation angle of a mobile terminal is usually 90±360 degrees or 270±360 degrees.

Correspondingly, the present invention also discloses a computer readable medium that contains processor executable program code, which may be applied in certain electronic devices. In an execution process, the program code makes the processor execute the steps as follows:

creating a full screen playing view, so that the full screen playing view covers the full screen blank view;

loading a video content to be played to the full screen playing view;

according to a received rotation angle of a mobile terminal, rotating the video content which has been loaded to the full screen playing view, and then playing the rotated video content in the full screen playing view.

Optionally, the program code makes the processor further execute the steps as follows:

according to a received rotation angle of a mobile terminal, rotating the video control bar.

Optionally, the step of loading the video content to be played to the full screen playing view comprises:

establishing a connection between the player and the full screen playing view via the player interface;

and then obtaining the video content to be played that is contained in the player through the foregoing connection, and then loading the video content to be played to the full screen playing view.

Optionally, the step of loading the video content to be played to the full screen playing view may also comprise:

saving the video content to be played that is contained in the player to the cache;

and then duplicating the video content to be played that is saved in the cache, and next load the duplicated video content to be played to the full screen playing view.

Optionally, the program code makes the processor further execute the steps as follows: deleting the full screen playing view after completion of playing the video content.

Optionally, the rotation angle of a mobile terminal is usually 90±360 degrees or 270±360 degrees.

Figure 11:
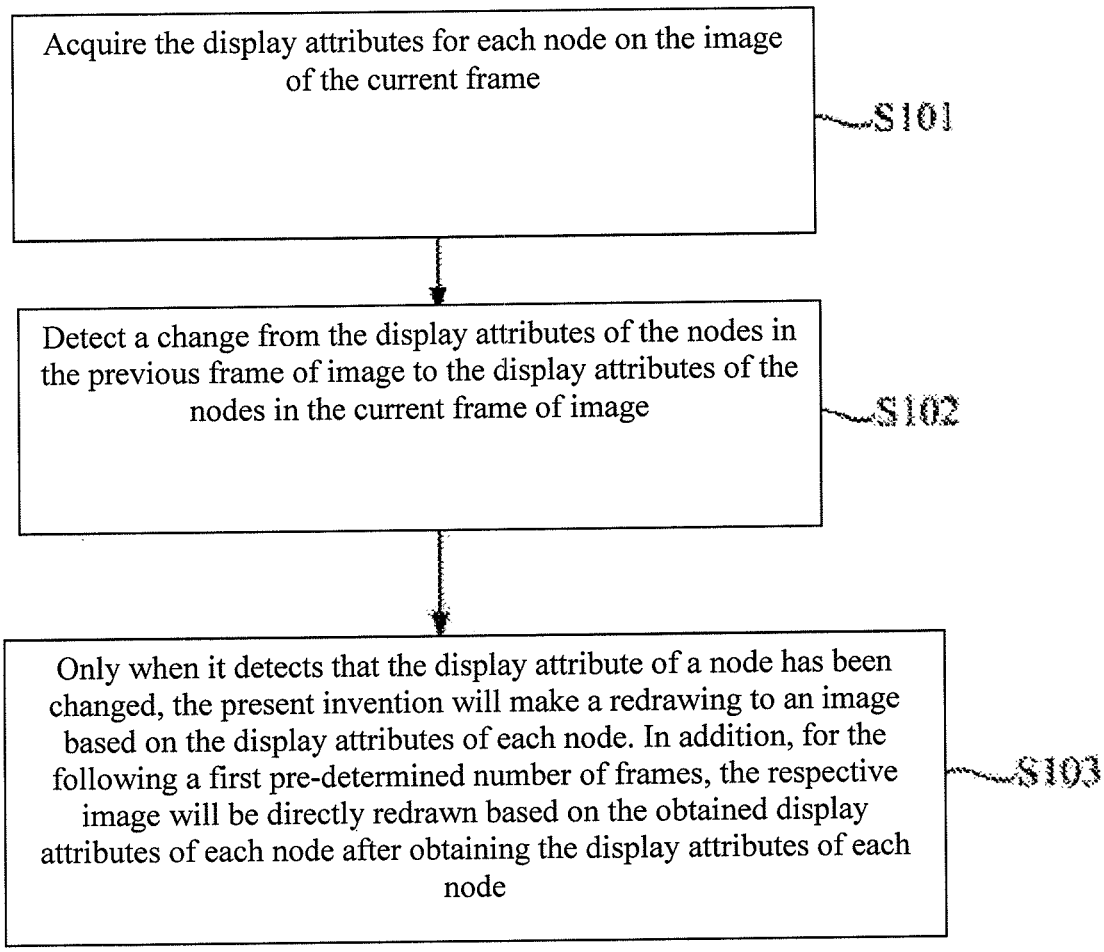
FIG. 11 is a flow chart of a method for improving graphics rendering efficiency according to an exemplary embodiment of the present invention.

FIG. 11 is a flow chart of a method for improving graphics rendering efficiency according to an exemplary embodiment of the present invention. The method can be applied to a wide variety of different terminal devices, such as mobile phone, tablet computer, PC (personal computer) and the like. In reference to FIG. 11, the method comprises the steps as follows:

S101, acquire the display attributes for each node on the image of the current frame.

A drawing program, such as an HTML5-based game engine, usually makes the drawing based on the nodes on the image. An image corresponds to a rendering tree, wherein the rendering tree has a root and numerous branches, and the root and the branches can be referred to as the graphic nodes, or simply nodes.

A graphic node has a display attribute. In this embodiment or other embodiments of the present invention, the display attribute of a node may comprise one or a plurality of the following elements: x coordinate of the node, y coordinate of the node, width of the node, height of the node, rotation angle of the node, inclination angle of the node, transparency of the node, visibility of the node, and color of the node.

The display attribute of a graphic node may be changed by other applications, which may result in a change in the image. By way of traversing each node and executing certain operations of updating the display attribute, a drawing program is able to obtain the display attribute of each node in the current frame of image.

S102, detect a change from the display attributes of the nodes in the previous frame of image to the display attributes of the nodes in the current frame of image.

In this embodiment of the present invention, after obtaining the display attributes of the nodes in the current frame of image, it does not directly redraw the image based on the new display attributes, rather, it firstly detects a change from the display attributes of the nodes in the previous frame of image to the display attributes of the nodes in the current frame of image, and then makes the decision about whether a redrawing is needed.

In this embodiment or certain other embodiments of the present invention, the display attributes of nodes may change, and the change includes:

Any element in any node changes.

That is to say, as long as a change in an element of a node has been detected, it is able to reach the conclusion that the display attributes of nodes change. On the contrary, in the case when no any change can be detected for any element in any node, it is able to reach the conclusion that the display attributes of nodes have no change.

S103, only when it detects that the display attribute of a node has been changed, the present invention will make a redrawing to an image based on the display attributes of each node. In addition, for the following a first pre-determined number of frames, the respective image will be directly redrawn based on the obtained display attributes of each node after obtaining the display attributes of each node.

For each frame of image, with the addition of the operation of detecting whether the display attributes of its nodes have been changed, it is able to reduce the number of redrawing; however, on the other hand, it may result in certain drawbacks as well. Since each time (in other words, each frame) needs to be detected, it will result in a large amount of detections, which may compromise the image drawing efficiency. Therefore, in the step of S103, following a detection of a change in the display attribute of a node(s), in addition to redrawing the current frame of image, the present will also directly redraw each frame of image of the following a first pre-determined number of frames of image without further detecting whether the display attributes of their nodes have been changed. In this way, it is able to reduce the amount of detection for whether the display attributes of nodes have been changed, and thus further improve the drawing efficiency, and reduce unnecessary consumption on CPU and other resources.

Figure 12:
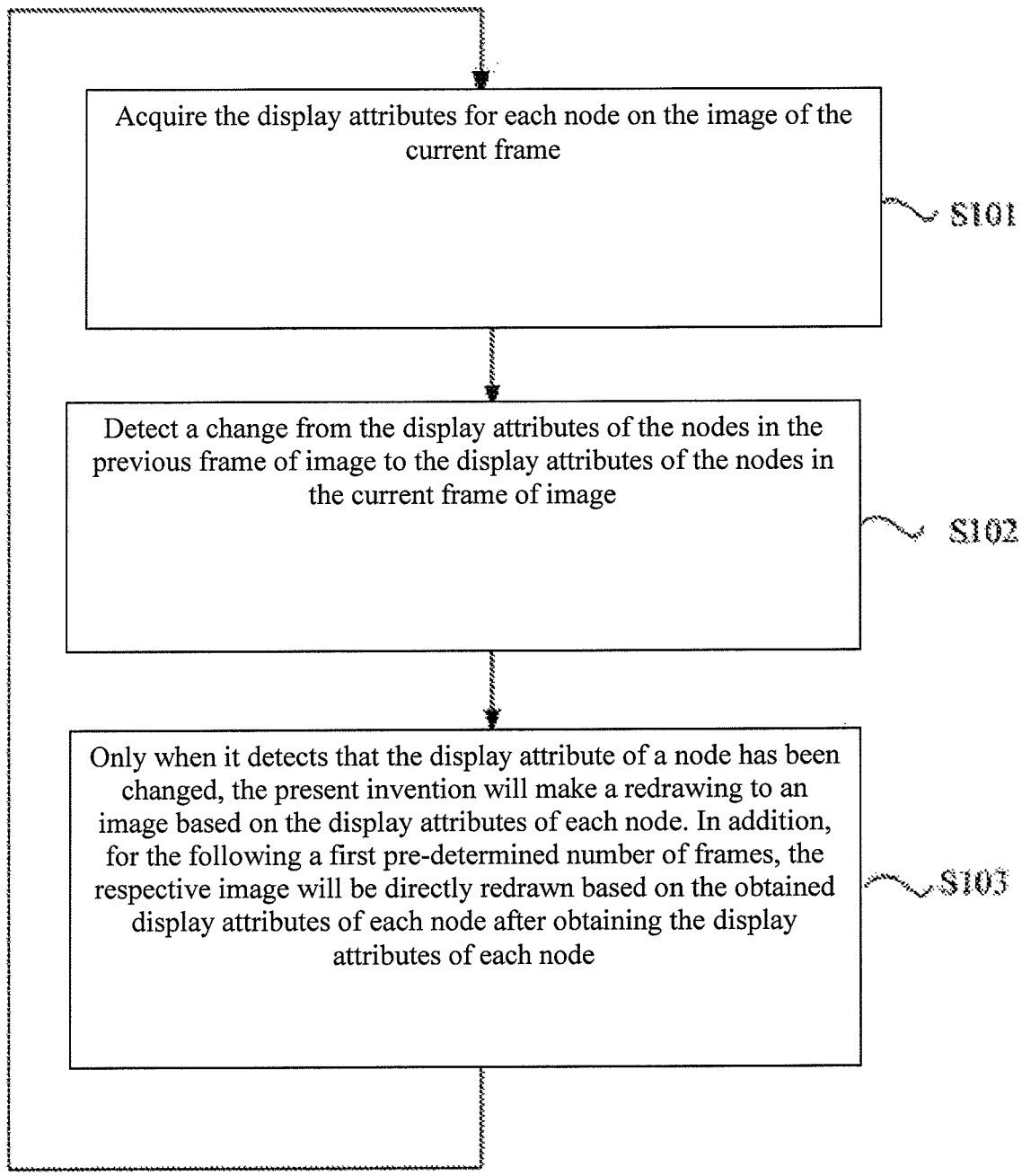
FIG. 12 is a flow chart of a method for improving graphics rendering efficiency according to another exemplary embodiment of the present invention.

In reference to FIG. 12, in this embodiment or certain other embodiments of the present invention, for the subsequent first pre-determined number of frames, following the step of redrawing the image directly based on the display attributes of the nodes after obtaining the display attributes of the nodes, they may have the following steps:

Return to the step of acquiring the display attributes for each node on the image of the current frame; in other words, return to the step 101.

The steps S101 to S103 can be cycled in a loop to make a continuous drawing.

Figure 13:
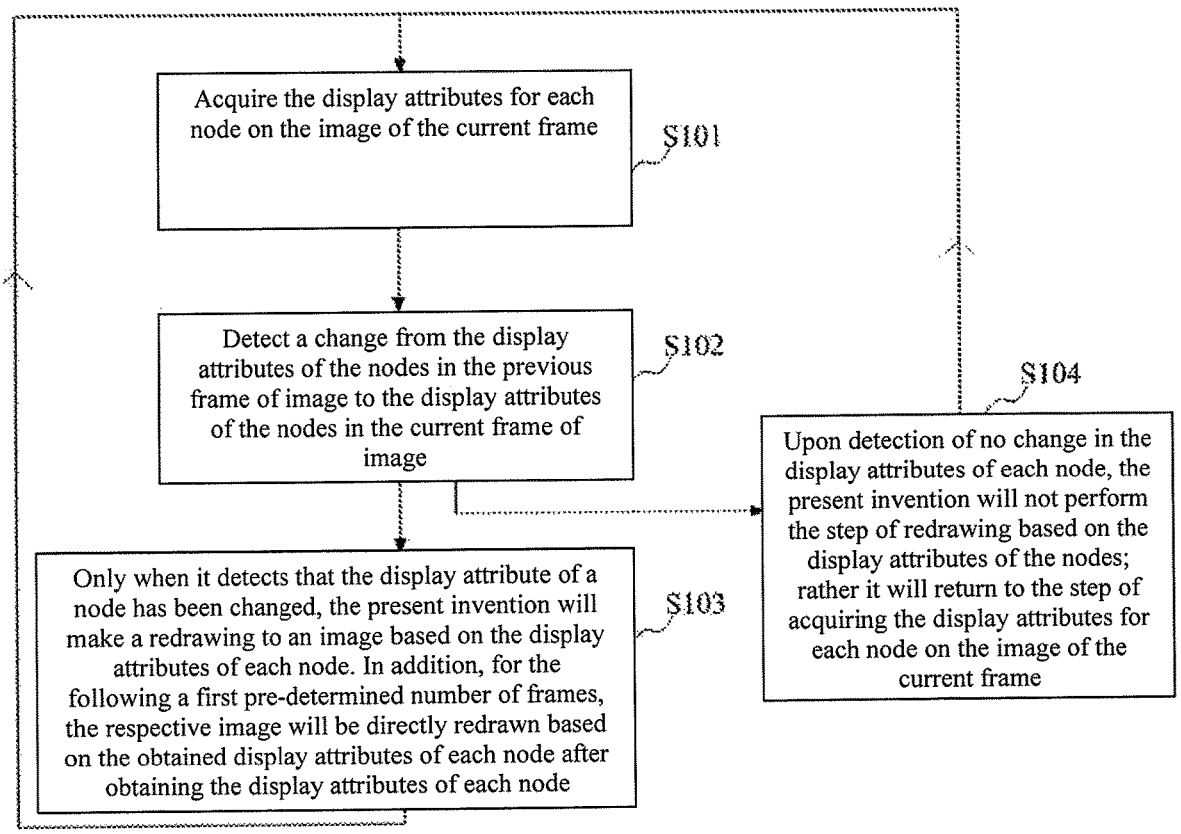
FIG. 13 is a flow chart of a method for improving graphics rendering efficiency according to another exemplary embodiment of the present invention.

Further, in reference to FIG. 13, in this embodiment or certain other embodiments of the present invention, after the step of detecting a potential change between the display attributes of the nodes in the current frame of image and the display attributes of the nodes in the previous frame of image, the method may further comprise:

S104, upon detection of no change in the display attributes of each node, the present invention will not perform the step of redrawing based on the display attributes of the nodes; rather it will return to the step of acquiring the display attributes for each node on the image of the current frame; in other words, return to the step 101.

In this way, no redrawing will be performed upon detection of no change in the display attributes of each node. As a result, it is able to reduce the number of redrawing and thus improve the drawing efficiency, as well as reduce unnecessary consumption on CPU and other resources.

In addition, the method may further include:

For a continuous second pre-determined number of frames, in the case when the display attributes of nodes have no change in each detection, in the following pre-determined length of time, directly redraw the image based on the obtained display attributes of nodes after obtaining the display attributes of nodes.

Next, return to the step of acquiring the display attributes for each node on the image of the current frame.

In this way, the amount of detections, whether the display attributes of nodes have been changed, can be further reduced. As a result, the drawing efficiency has been further improved.

In reference to a specific scenario, the present invention will be further described in detail.

Figure 14:
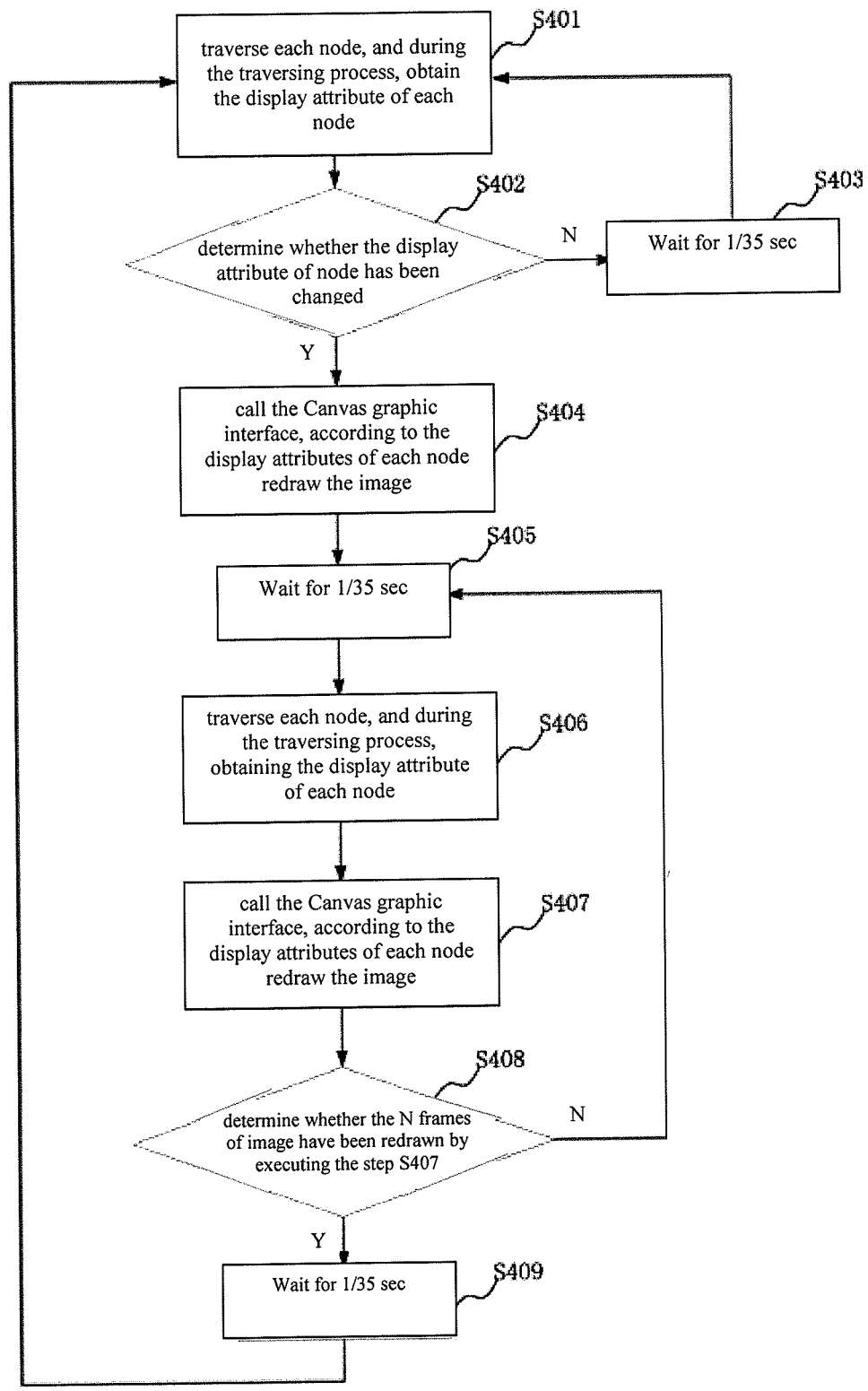
FIG. 14 is a flow chart of a method for improving graphics rendering efficiency according to another exemplary embodiment of the present invention.

FIG. 14 is a flow chart of a method for improving graphics rendering efficiency according to another exemplary embodiment of the present invention. In this case scenario, JavaScript can draw images in the browser based on the drawing interface provided by Canvas. Its frame rate is 35 frames per second, and the interval between each frame is $\frac{1}{35}$ second, that is to say, a redrawing to the image may be performed every $\frac{1}{35}$ seconds.

S401, traversing each node, and during the traversing process, obtaining the display attribute of each node; in addition, the display attribute of each node may be changed by other application programs, for example, an application program may change the x-axis coordinate value of a node by way of using JavaScript to call setX. In addition, by way of executing an updating operation, it is able to obtain the display attribute of each node in the current frame of image.

S402, determine whether the display attribute of node has been changed; and if the display attribute of a node has been changed, enter the step S404, otherwise, enter the step S403.

S403, wait for $\frac{1}{35}$ seconds, and then jump back to the step S401. That is to say, wait for the next frame, and then determine whether the next frame needs to be redrawn.

S404, call the Canvas graphic interface, according to the display attributes of each node redraw the image.

S405, wait for $\frac{1}{35}$ seconds.

S406, traverse each node, and during the traversing process, obtaining the display attribute of each node.

S407, call the Canvas graphic interface, according to the display attributes of each node redraw the image. In this case, it does not perform the determination on whether the display attribute of node has been changed.

S408, determine whether the N frames of image have been redrawn by executing the step S407. That is to say, if N number of redrawings have been performed after the step S404. The specific value of N may be determined according to specific situation.

If it is Yes, proceed to the step S409; if it is No, jump back to the step S405.

S409, wait for $\frac{1}{35}$ seconds, and then jump back to the step S401. That is to say, start a new cycle.

In this embodiment, before performing a redrawing, it first detects whether the display attributes of nodes have been changed, and only perform the redrawing when it has detected that the display attribute of a nodes has been changed. More importantly, in order to reduce the amount of detections, as a default, the following a series of frames of images will be redrawn directly without detection. In this way, the drawing method provided in this embodiment is able to not only reduce the number of redrawings, but also reduce the amount of detections on whether the display attributes of nodes have been changed. As a result, it is able to reduce the number of redrawing and thus improve the drawing efficiency, as well as reduce unnecessary consumption on CPU and other resources.

Those skilled in the art can clearly understand that the technology disclosed in the embodiments of the present invention can be implemented by software plus a necessary universal hardware platform. Based on this understanding, the technical solution of the present invention is essentially, or the part contributing to the prior art may be embodied in, the form of a software product. The computer software product may be stored in a storage medium, such as ROM/RAM, a magnetic disk, optical disk, which include a number of instructions to make a computer device (a personal computer, server, or network equipment) perform the method of the embodiments of the present invention, or some portions of the embodiments of the present invention.

The embodiments of the present invention in the Description are described in a progressive way. The same or similar parts of the various embodiments may be used as reference to others. What have been specifically described in each embodiment are its differences from other embodiments of the present invention. In particular, as for the system embodiment, since it is substantially similar to the method embodiments, its description is relatively simple. Please refer to the related parts in the method embodiments for more details.

The embodiments of the invention described above are not intended to limit the scope of the present invention. Any modifications, equivalent replacement and improvement within the spirit and principles of the present invention should be included within the scope of the present invention.

What is claimed is:

1. A computer-implemented method for reducing CPU and hardware resource consumption and accelerating a switching process of a mobile terminal, the computer-implemented method comprising:

displaying, on a screen of the mobile terminal, a video content in a non-full-screen playing mode covering a partial area of the screen;

receiving, via the mobile terminal, an electronic request to switch a playing mode of the mobile terminal from the non-full-screen playing mode to a full screen playing mode;

in response to receiving the electronic request to switch the playing mode of the mobile terminal from the non-full-screen playing mode to the full screen playing mode, generating, by a processor of the mobile terminal, a full screen blank view and a full screen playing view, the full screen blank view covering an entire area of the screen, and the full screen playing view covering the full screen blank view;

loading, by the processor, the video content to the full screen playing view;

subsequent to loading the video content to the full screen playing view, rotating, by the processor, the video content which has been loaded to the full screen playing view according to a rotation angle of the mobile terminal, comprising:

acquiring, by the processor, display attributes for each node on an image of a current frame of a sequence of frames of the video content;

detecting, by the processor, a change between display attributes of nodes in a previous frame and the display attributes of the nodes in the current frame according to the rotation angle, wherein the previous frame is immediately prior to the current frame in the sequence of frames; and in response to detecting the change, redrawing, by the processor, the image based on the display attributes of the nodes in the current frame and display attributes of nodes in a first pre-determined number of frames following the current frame in the sequence of frames without detecting whether there is a change between the display attributes of the nodes in the first pre-determined number of frames;

displaying, on the screen of the mobile terminal, the rotated video content in the full screen playing view; and subsequent to displaying the rotated video content in the full screen playing view, deleting, by the processor, the full screen playing view.

2. The computer-implemented method according to claim 1, further comprising:

according to the rotation angle of the mobile terminal, rotating, by the processor, a video control bar.

3. The computer-implemented method according to claim 1, wherein loading the video content to the full screen playing view comprises:

establishing, by the processor and via a player interface, a connection between a player and the full screen playing view;

obtaining, by the processor, the video content contained in the player via the connection; and loading, by the processor, the video content to the full screen playing view.

4. The computer-implemented method according to claim 3, wherein loading the video content to the full screen playing view comprises:

storing, by the processor, the video content contained in the player into a cache;

duplicating, by the processor, the video content that has been saved in the cache; and loading, by the processor, the duplicated video content to the full screen playing view.

5. The computer-implemented method according to claim 1, wherein the rotation angle is one of 90+360 degrees, 90-360 degrees, 270+360 degrees and 270-360 degrees.

6. The computer-implemented method according to claim 1, wherein loading the video content to be played to the full screen playing view comprises:

rotating, by the processor, a rendering direction of the video content in the full screen playing view.

7. The computer-implemented method according to claim 6, further comprising:

receiving, by the mobile terminal, an electronic indication indicating that a horizontal displaying mode is needed;

determining, by the processor, whether the video content is in a horizontal style or a vertical style; and based on determining that the video content is in the vertical style, after obtaining the rotation angle for the full screen playing view, rotating, by the processor, the rendering direction of the video content in the full screen playing view, so as to display the video content in the horizontal style in the full screen playing view.

8. A device for reducing hardware resource consumption and accelerating a switching process of a mobile terminal, comprising one or more processors and one or more memories storing executable instructions, wherein, when the executable instructions are executed by the one or more processors, the one or more processors are configured to perform the following:

displaying a video content in a non-full-screen playing mode covering a partial area of a screen of the mobile terminal;

receiving an electronic request to switch a playing mode of the mobile terminal from the non-full-screen playing mode to a full screen playing mode;

in response to receiving the electronic request to switch the playing mode of the mobile terminal from the non-full-screen playing mode to the full screen playing mode, generating a full screen blank view and a full screen playing view, the full screen blank view covering an entire area of the screen, and the full screen playing view covering the full screen blank view;

loading the video content to the full screen playing view;

subsequent to loading the video content to the full screen playing view, rotating the video content which has been loaded to the full screen playing view according to a rotation angle of the mobile terminal, comprising:

acquiring display attributes for each node on an image of a current frame of a sequence of frames of the video content;

detecting a change between display attributes of nodes in a previous frame and the display attributes of the nodes in the current frame, wherein the previous frame is prior to the current frame in the sequence of frames; and in response to detecting the change, redrawing the image based on the display attributes of the nodes in the current frame and display attributes of nodes in a first pre-determined number of frames following the current frame in the sequence of frames without detecting whether there is a change between the display attributes of the nodes in the first pre-determined number of frames;

displaying the rotated video content in the full screen playing view; and subsequent to displaying the rotated video content in the full screen playing view, deleting the full screen playing view.

9. The device according to claim 8, wherein the one or more processors are further configured to execute the executable instructions to perform:

according to the rotation angle of the mobile terminal, rotating a video control bar.

10. The device according to claim 8, wherein loading the video content to the full screen playing view further causes the one or more processors to execute the executable instructions to perform:
   establishing a connection between a player and the full screen playing view via a player interface;
   obtaining the video content contained in the player via the connection; and
   loading the video content to the full screen playing view.

11. The device according to claim 10, wherein loading the video content to the full screen playing view further causes the one or more processors to execute the executable instructions to perform:
   storing the video content contained in the player into a cache;
   duplicating the video content that has been saved in the cache; and
   loading the duplicated video content to the full screen playing view.

12. The device according to claim 8, wherein the rotation angle is one of 90+360 degrees, 90-360 degrees, 270+360 degrees and 270-360 degrees.

13. A non-transitory computer readable medium for reducing hardware resource consumption and accelerating a switching process of a mobile terminal, comprising processor executable program codes stored herein, which can be applied to the mobile terminal, characterized in that the processor executable program codes are configured to enable a processor of the mobile terminal to execute the following:
   displaying a video content in a non-full-screen playing mode covering a partial area of a screen of the mobile terminal;
   receiving an electronic request to switch a playing mode of the mobile terminal from the non-full-screen playing mode to a full screen playing mode;
   in response to receiving the electronic request to switch the playing mode of the mobile terminal from the non-full-screen playing mode to the full screen playing mode, generating a full screen blank view and a full screen playing view, the full screen blank view covering an entire area of the screen, and the full screen playing view covering the full screen blank view;
   loading the video content to the full screen playing view;
   subsequent to loading the video content to the full screen playing view, rotating the video content which has been loaded to the full screen playing view according to a rotation angle of the mobile terminal, comprising:
      acquiring display attributes for each node on an image of a current frame of a sequence of frames of the video content;
      detecting a change between display attributes of nodes in a previous frame and the display attributes of the nodes in the current frame, wherein the previous frame is prior to the current frame in the sequence of frames; and
      in response to detecting the change, redrawing the image based on the display attributes of the nodes in the current frame and display attributes of nodes in a first pre-determined number of frames following the current frame in the sequence of frames without detecting whether there is a change between the display attributes of the nodes in the first pre-determined number of frames;
   playing the rotated video content in the full screen playing view; and
   subsequent to playing the rotated video content in the full screen playing view, deleting, by the processor, the full screen playing view.

14. The computer-implemented method according to claim 1, wherein the full screen playing view is a TextureView, wherein the TextureView covers the full screen blank view.

15. The computer-implemented method according to claim 4, wherein the full screen blank view is a OpenGL Surface View, wherein loading, by the processor, the duplicated video content to the full screen playing view further comprises loading the duplicated video content to the OpenGL Surface View.

16. The computer-implemented method of claim 1, wherein rotating the video content further comprises:
   determining, by the processor, that there is no change in display attributes of nodes of a second pre-determined number of frames; and
   in response to determining that there is no change, redrawing, by the processor, the image in a pre-determined length of time following the second pre-determined number of frames.

17. The device of claim 8, wherein rotating the video content further comprises:
   determining that there is no change in display attributes of nodes of a second pre-determined number of frames; and
   in response to determining that there is no change, redrawing the image in a pre-determined length of time following the second pre-determined number of frames.

* * * * *